(12) United States Patent
Bhagat et al.

(10) Patent No.: US 12,194,696 B2
(45) Date of Patent: Jan. 14, 2025

(54) MONOLITHIC HIGH REFRACTIVE INDEX PHOTONIC DEVICES (71) Applicant: Molecular Imprints, Inc., Austin, TX (US)

(72) Inventors: Sharad D. Bhagat, Austin, TX (US); Christophe Peroz, Tokyo (JP); Vikramjit Singh, Pflugerville, TX (US); Frank Y. Xu, Austin, TX (US)

(73) Assignee: Molecular Imprints, Inc., Austin, TX (US)

( * ) Notice: Subject to any disclaimer, the term of this patent is extended or adjusted under 35 U.S.C. 154(b) by 0 days.

(21) Appl. No.: 18/364,633

(22) Filed: Aug. 3, 2023

(65) Prior Publication Data
US 2023/0373173 A1 Nov. 23, 2023

Related U.S. Application Data (60) Continuation of application No. 17/072,998, filed on Oct. 16, 2020, now abandoned, which is a division of (Continued)

(51) Int. Cl.
*B29D 11/00* (2006.01)
*B29C 33/62* (2006.01)
(Continued)

(52) U.S. Cl.
CPC ........ *B29D 11/00326* (2013.01); *B29C 33/62* (2013.01); *B29D 11/0048* (2013.01);
(Continued)

(58) Field of Classification Search
CPC ........... G02B 1/04; G02B 1/041; C08L 81/02; C08L 83/00; B29C 33/62;
(Continued)

(56) References Cited

U.S. PATENT DOCUMENTS 4,990,364 A   2/1991 Bolte et al.
5,876,805 A   3/1999 Ostile
(Continued)

FOREIGN PATENT DOCUMENTS

CN   101422774   5/2009
CN   101441282   5/2009
(Continued)

OTHER PUBLICATIONS

Technical datasheet of OPTOOL DSX_Apr_2018 (Year: 2018).*
(Continued)

*Primary Examiner* — Yunju Kim
(74) *Attorney, Agent, or Firm* — Fish & Richardson P.C.

(57) ABSTRACT

Fabricating a high refractive index photonic device includes disposing a polymerizable composition on a first surface of a first substrate and contacting the polymerizable composition with a first surface of a second substrate, thereby spreading the polymerizable composition on the first surface of the first substrate. The polymerizable composition is cured to yield a polymeric structure having a first surface in contact with the first surface of the first substrate, a second surface opposite the first surface of the polymeric structure and in contact with the first surface of the second substrate, and a selected residual layer thickness between the first surface of the polymeric structure and the second surface of the polymeric structure in the range of 10 µm to 1 cm. The polymeric structure is separated from the first substrate and the second substrate to yield a monolithic photonic device having a refractive index of at least 1.6.

19 Claims, 10 Drawing Sheets

Related U.S. Application Data application No. 15/684,530, filed on Aug. 23, 2017, now Pat. No. 10,828,855.

(60) Provisional application No. 62/502,973, filed on May 8, 2017, provisional application No. 62/380,093, filed on Aug. 26, 2016.

(51) Int. Cl.

| | | |
|---|---|---|
| *G02B 1/04* | (2006.01) | |
| *B29K 33/04* | (2006.01) | |
| *B29K 105/00* | (2006.01) | |
| *B29K 105/16* | (2006.01) | |
| *B29K 283/00* | (2006.01) | |
| *B29K 509/02* | (2006.01) | |

(52) U.S. Cl.
CPC ............... *G02B 1/04* (2013.01); *G02B 1/041* (2013.01); *B29K 2033/04* (2013.01); *B29K 2105/0002* (2013.01); *B29K 2105/162* (2013.01); *B29K 2283/00* (2013.01); *B29K 2509/02* (2013.01); *B29K 2995/0026* (2013.01)

(58) Field of Classification Search
CPC .......... B29D 11/00326; B29D 11/0048; B29K 2033/04; B29K 2105/0002; B29K 2105/162; B29K 2283/00; B29K 2509/02; B29K 2995/0026

See application file for complete search history.

(56) References Cited

U.S. PATENT DOCUMENTS

| | | | |
|---|---|---|---|
| 10,828,855 | B2 | 11/2020 | Bhagat et al. |
| 2002/0090470 | A1 | 7/2002 | Kubota et al. |
| 2003/0004229 | A1 | 1/2003 | Schermacher et al. |
| 2008/0055929 | A1 | 3/2008 | Kuroda et al. |
| 2008/0141862 | A1* | 6/2008 | Xu ................... B01D 19/0005 95/263 |
| 2010/0059904 | A1* | 3/2010 | Kasumi ................. B82Y 40/00 425/149 |
| 2010/0072643 | A1 | 3/2010 | Pugh et al. |
| 2010/0104852 | A1 | 4/2010 | Fletcher et al. |
| 2010/0119782 | A1* | 5/2010 | Ohgane ................. C25D 11/24 428/174 |
| 2011/0071252 | A1 | 3/2011 | Prince et al. |
| 2011/0244131 | A1 | 10/2011 | Kawamura et al. |
| 2012/0286435 | A1 | 11/2012 | Bojkova et al. |
| 2014/0117397 | A1 | 5/2014 | Saeki et al. |
| 2014/0305904 | A1* | 10/2014 | Lan ...................... G03F 7/0002 216/41 |
| 2015/0056413 | A1 | 2/2015 | Hwang et al. |
| 2015/0079793 | A1 | 3/2015 | Hattori et al. |
| 2015/0165671 | A1 | 6/2015 | Im et al. |
| 2016/0009029 | A1 | 1/2016 | Cohen et al. |
| 2016/0108315 | A1 | 4/2016 | Matsuyama et al. |
| 2016/0109799 | A1 | 4/2016 | Hernandez et al. |
| 2016/0136889 | A1 | 5/2016 | Rolland et al. |
| 2016/0164261 | A1 | 6/2016 | Warren |
| 2016/0289395 | A1 | 10/2016 | Stiegman |
| 2017/0022300 | A1 | 1/2017 | Hirahara et al. |
| 2017/0052284 | A1 | 2/2017 | Badarinarayana et al. |
| 2017/0315346 | A1 | 11/2017 | Tervo et al. |
| 2018/0056614 | A1 | 3/2018 | Bhagat et al. |
| 2019/0126223 | A1 | 5/2019 | Bhagat et al. |
| 2020/0156311 | A1 | 5/2020 | Rolland et al. |

FOREIGN PATENT DOCUMENTS

| | | |
|---|---|---|
| CN | 102019662 | 4/2011 |
| CN | 102119344 | 7/2011 |
| CN | 107107168 | 8/2017 |
| JP | S4879259 A | 10/1973 |
| JP | S61-063416 | 4/1986 |
| JP | H05210003 A | 8/1993 |
| JP | H07016852 | 3/1995 |
| JP | H08156123 A | 6/1996 |
| JP | H08207159 A | 8/1996 |
| JP | H10010477 | 1/1998 |
| JP | H11072849 A | 3/1999 |
| JP | H11140626 A | 5/1999 |
| JP | 2002-189103 | 7/2002 |
| JP | 2003502168 A | 1/2003 |
| JP | 2003-103531 A | 4/2003 |
| JP | 2008-265001 A | 11/2008 |
| JP | 2009266841 A | 11/2009 |
| JP | 2010064335 A | 3/2010 |
| JP | 2011-506110 | 3/2011 |
| JP | 2011-084060 A | 4/2011 |
| JP | 2012-049152 A | 3/2012 |
| JP | 2012-051756 | 3/2012 |
| JP | 2012049471 A | 3/2012 |
| JP | 2012-071556 A | 4/2012 |
| JP | 2012202090 A | 10/2012 |
| JP | 2014-152194 | 8/2014 |
| JP | 2016-029883 | 3/2016 |
| JP | 2016-107522 A | 6/2016 |
| KR | 20110073358 A | 6/2011 |
| KR | 20130017057 A | 2/2013 |
| KR | 20160027147 A | 3/2016 |
| KR | 20170116109 A | 10/2017 |
| WO | 2011096368 A1 | 8/2011 |
| WO | WO 2012/002446 | 1/2012 |
| WO | WO 2013/151151 | 10/2013 |
| WO | WO 2016/114362 | 7/2016 |
| WO | WO 2016/204605 | 12/2016 |
| WO | WO 2018/039323 | 3/2018 |

OTHER PUBLICATIONS

Authorized Officer Blaine R. Copenheaver, International Search Report and Written Opinion for International Application No. PCT/US2017/048182, mailed Nov. 2, 2017, 14 pages.

JP Office Action in Japanese Appln. No. 2019-510775, dated Mar. 1, 2021, 10 pages (with English translation).

JP Office Action in Japanese Appln. No. 2019-510775, dated Nov. 1, 2021, 6 pages (with English Translation).

Mercene Labs, Ostemers.com [online], "Ostemer 324 Flex," Sep. 20, 2016, retrieved on Dec. 20, 2018, retrieved from URL<https://www.ostemers.com/wp-content/uploads/2016/11/Data-sheet-OSTEMER-324-Flex.pdf>, 5 pages.

Office Action in Chinese Appln. No. 201780052297.8, dated Mar. 28, 2022, 32 pages (with English translation).

Office Action in Japanese Appln. No. 2021-142302, dated Sep. 28, 2022, 8 pages (with English translation).

Office Action in Japanese Appln. No. 2022-033548, dated Apr. 14, 2023, 3 pages (with English translation).

TW Search Report in Taiwan Appln. No. 106128881, dated Feb. 5, 2021, 2 pages (with English translation).

Notice of Allowance in Korean Appln. No. 10-2020-7015276, dated Feb. 21, 2024, 4 pages (with English translation).

Office Action in Japanese Appln. No. 2023-149307, dated Apr. 30, 2024, 5 pages (with English translation).

Notice of Allowance in Japanese Appln. No. 2023-149307, dated Aug. 2, 2024, 6 pages (with English translation).

\* cited by examiner

MONOLITHIC HIGH REFRACTIVE INDEX PHOTONIC DEVICES

CROSS-REFERENCE TO RELATED APPLICATIONS

This application is a continuation of U.S. application Ser. No. 17/072,998 entitled "MONOLITHIC HIGH REFRACTIVE INDEX PHOTONIC DEVICES" filed on Oct. 16, 2020, which is a divisional of U.S. application Ser. No. 15/684,530 entitled "MONOLITHIC HIGH REFRACTIVE INDEX PHOTONIC DEVICES" filed on Aug. 23, 2017, now U.S. Pat. No. 10,828,855, which claims the benefit of U.S. Application No. 62/380,093 entitled "MONOLITHIC HIGH REFRACTIVE INDEX PHOTONIC DEVICES" filed on Aug. 26, 2016, and U.S. Application No. 62/502,973 entitled "MONOLITHIC HIGH REFRACTIVE INDEX PHOTONIC DEVICES" and filed on May 8, 2017, all of which are incorporated herein by reference in their entirety.

TECHNICAL FIELD

This invention generally relates to monolithic high refractive index photonic devices.

BACKGROUND

Fabrication of photonic devices is typically a multi-step process that includes patterning of a substrate with nano- and microstructures. Patterning may be achieved by a lithographic technique such as UV lithography, nanoimprinting, or the like. In some cases, a pattern is transferred into a thin film or substrate by etching (e.g., plasma etching or liquid etching). Thus, fabrication of photonic devices is usually expensive and slow, involving multiple processing steps.

SUMMARY

In a first general aspect, fabricating a high refractive index photonic device includes disposing a polymerizable composition on a first surface of a first substrate and contacting the polymerizable composition with a first surface of a second substrate, thereby spreading the polymerizable composition on the first surface of the first substrate (e.g., between the first surface of the first substrate and the first surface of the second substrate). The polymerizable composition is cured to yield a polymeric structure having a first surface in contact with the first surface of the first substrate, a second surface opposite the first surface of the polymeric structure and in contact with the first surface of the second substrate, and a selected residual layer thickness between the first surface of the polymeric structure and the second surface of the polymeric structure in the range of 10 μm to 1 cm. The polymeric structure is separated from the first substrate and the second substrate to yield a monolithic photonic device having a refractive index of at least 1.5 or at least 1.6.

Implementations of the first general aspect may include one or more of the following features.

At least one of the first substrate and the second substrate may be a patterned mold, the first surface of the patterned mold defining protrusions and recessions. Some implementations of the first general aspect include coating the first surface of the first substrate, the first surface of the second substrate, or both with a release layer before disposing the polymerizable composition on the first surface of the first substrate. In one example, the first surface of the second substrate is coated with a release layer before the polymerizable composition is contacted with the first surface of the second substrate.

Some implementations of the first general aspect include heating the first substrate to at least 100° C. before disposing the polymerizable composition on the first surface of the first substrate. The first general aspect may also include heating the first substrate, the second substrate, or both to at least 100° C. before contacting the polymerizable composition with the first surface of the second substrate.

Some implementations of the first general aspect include partially polymerizing the polymerizable composition before disposing the polymerizable composition on the first surface of the first substrate. Contacting the polymerizable composition with the second substrate may include forming an acute angle between the first substrate and the second substrate, and reducing the value of the acute angle until the first substrate and the second substrate are parallel.

Curing the polymerizable composition may include heating the polymerizable composition to a temperature less than 100° C. or between 100° C. and 350° C. Curing the polymerizable composition may include curing the polymerizable composition for a duration of less than 5 minutes.

In some cases, curing the polymerizable composition includes irradiating the polymerizable composition with ultraviolet (UV) radiation. A duration of the UV radiation may be less than 5 minutes. An intensity of the UV radiation may be substantially constant throughout the duration of the irradiation of the polymerizable composition. In some cases, an intensity of the UV radiation is in a range from less than 30 mW/cm$^2$ to over 110 mW/cm$^2$, or greater than 50 mW/cm$^2$. In certain cases, an intensity of the UV radiation is in a range of 5 mW/cm$^2$ to 300 mW/cm$^2$. Irradiating the polymerizable composition with the UV radiation may include irradiating a surface area of the polymerizable composition in a range of 1 cm$^2$ to 1000 cm$^2$. An intensity of the ultraviolet radiation may be substantially constant over the irradiated surface area of the polymerizable composition. In some cases, an intensity of the UV radiation is varied over the irradiated surface area of the polymerizable composition to achieve a pre-defined local shrinkage in the monolithic photonic device. The UV radiation may include at least one of UVA, UVB, and UVC. In some cases, a wavelength of the UV radiation is in a range of 250 nm to 380 nm. In certain cases, a wavelength of the UV radiation is in a range of about 315 nm to about 400 nm (e.g., 365 nm±20 nm). In some cases, a wavelength of the UV radiation includes at least one of 365 nm, 380 nm, and 405 nm.

In certain cases, curing the polymerizable composition includes heating the polymerizable composition to a temperature between 100° C. and 350° C. and irradiating the polymerizable composition with UV radiation.

In some implementations, the selected residual layer thickness between the first surface of the polymeric structure and the second surface of the polymeric structure is in a range of 250 μm to 500 μm. In some cases, the refractive index of the monolithic photonic device is at least 1.65 or at least 1.7. The transmittance of the monolithic photonic device between 400 nm and 800 nm may be greater than 80%.

The polymerizable composition may include first monomers and second monomers, each first monomer having at least two vinyl, allyl, or acrylate moieties, and each second monomer having at least two thiol moieties. In some cases, the polymerizable composition includes a photoinitiator, a thermal initiator, or both. In certain cases, the polymerizable composition includes a metal oxide. The metal oxide may include at least one of titanium oxide, zirconium oxide, and zinc oxide.

In some implementations, the polymerizable composition includes 20 wt % to 90 wt % of a high viscosity multifunctional component, 5 wt % to 40 wt % of a low viscosity mono- or multifunctional component, 0.2 wt % to 5 wt % of a photoinitiator, 0.2 wt % to 2 wt % of a light stabilizer, and 0.2 wt % to 2 wt % of an antioxidant, and curing the polymerizable composition includes polymer crosslinking through a single functionality. The polymerizable composition may include a surfactant. In some cases, the polymerizable composition includes inorganic nanoparticles or molecular level clusters.

In some implementations, the polymerizable composition includes 20 wt % to 80 wt % of a multifunctional component with a first reactive moiety, 20 wt % to 80 wt % of a multifunctional component with a second reactive moiety, 0.2 wt % to 5 wt % of a photoinitiator, 0.2 wt % to 2 wt % of a light stabilizer, and 0.2 wt % to 2 wt % of an antioxidant, and the first reactive moiety and the second reactive moiety are different, and curing the polymerizable composition comprises polymer crosslinking through cross-reaction through at least the first reactive moiety and the second reactive moiety. In some cases, the polymerizable composition includes a surfactant. In certain cases, the polymerizable composition includes inorganic nanoparticles having a maximum particle size of 20 nm.

The first substrate and the second substrate may be discs having a thickness in a range of 300 µm to 10 mm. A total thickness variation of the first substrate and the second substrate is typically in a range of 100 nm to 20 µm.

The photonic device may be optically transparent. In some cases, the photonic device is a lens. In certain cases, a first surface of the photonic device, a second surface of the photonic device, or both have a patterned surface defining protrusions and recessions, and a dimension of each protrusion and recession is less than 10 nm, less than 100 nm, less than 1 µm, less than 10 µm, less than 100 µm, or less than 1 mm.

In a second general aspect, a photonic device includes a monolithic structure of a cured polymeric material having at least one patterned surface defining protrusions and recessions. The refractive index of the monolithic structure is typically at least 1.6, and a minimum thickness of the monolithic structure is typically in a range of 10 µm to 1 cm.

Implementations of the second general aspect may include one or more of the following features.

At least one of a first surface of the photonic device and a second surface of the photonic device opposite the first surface is a patterned surface defining protrusions and recessions, and a dimension of each protrusion and recession is less than 10 nm, less than 100 nm, less than 1 µm, less than 10 µm, less than 100 µm, or less than 1 mm.

In some cases, the cured polymeric material includes a thiol-ene based polymer. In certain cases, the cured polymeric material includes a metal oxide. In one example, the cured polymeric material includes 0.1 wt % to 30 wt % of the metal oxide. The metal oxide may include titanium dioxide, zirconium dioxide, zinc oxide, or a combination thereof.

The refractive index of the monolithic photonic device is typically in a range of 1.6-1.9. The field of view of the photonic device (4:3 aspect ratio) may be up to 50° or up to 70°. In some cases, the photonic device is optically transparent. In certain cases, the photonic device is a lens.

Methods and materials are described herein for use in the present application; other, suitable methods and materials known in the art can also be used. The materials, methods, and examples are illustrative only and not intended to be limiting. All publications, patent applications, patents, and other references mentioned herein are incorporated by reference in their entirety. In case of conflict, the present specification, including definitions, will control.

Other features and advantages of the present application will be apparent from the following detailed description and figures, and from the claims.

DETAILED DESCRIPTION

Figure 1:
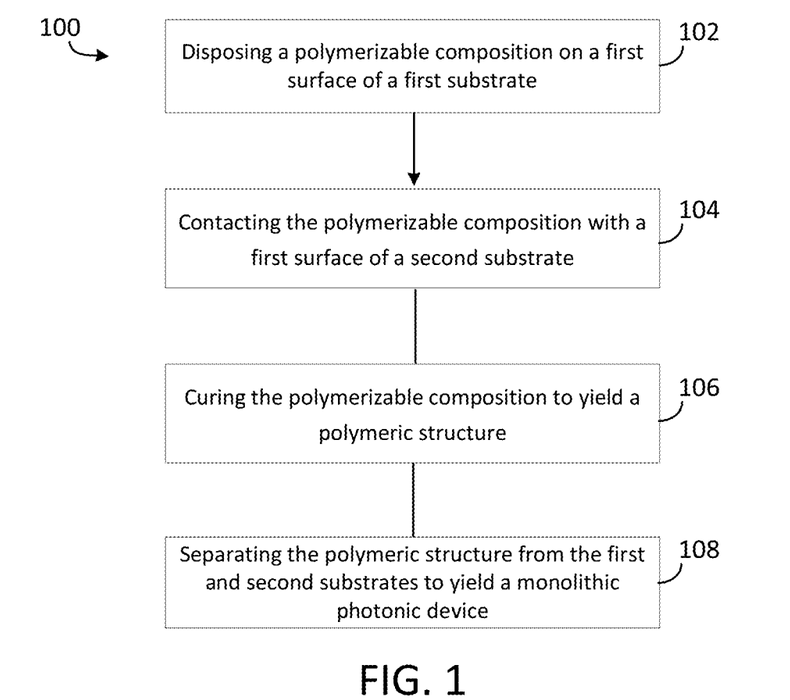
FIG. 1 is a flowchart of a first exemplary process for fabrication of a photonic device.

FIG. 1 is a flowchart describing a first exemplary process 100 for fabrication of a monolithic, optically transparent, high refractive index photonic device from a thiol-ene based polymer resin. As used herein, "photonic device" generally refers to a device for generating, detecting, or manipulating photons through emission, transmission, modulation, signal processing, switching, amplification, or detection. Examples of photonic devices include lenses and eyepieces. As used herein, a "monolithic" photonic device generally refers to a photonic device formed in a molding process as a single piece from a single polymerizable composition. That is, a monolithic photonic device is a seamless structure molded from a single material. As used herein, "optically transparent" generally refers to the physical property of allowing light to pass through a material without being scattered. As used herein, "high refractive index" generally refers to a refractive index (n) greater than 1.6. In one example, "high refractive index" refers to n greater than 1.6 and less than 1.9. As used herein, "thiol-ene based polymer resins" generally refers to a polymerizable composition including "thiol" monomers having at least two thiol moieties and "ene" monomers having at least two vinyl, allyl, or acrylate moieties. A thiol-ene based polymer resin may also include a photoinitiator, a thermal initiator, an inorganic compound, a stabilizer, or any combination thereof.

As used herein, total thickness variation (TTV) refers to the difference between the maximum and minimum values of the thickness of a substrate in a series of point measurements across a dimension of a substrate. For a substrate having a patterned surface, the TTV refers to an approximation assessed by ignoring contributions of pattern features to the thickness. By way of explanation, a thickness (or height) of a typical feature on a patterned substrate is about 10 nm to 150 nm. That thickness is primarily governed by the trench depth of the template, which can vary by 10% (e.g., 1 nm to 15 nm). The TTV of an unpatterned substrate typically exceeds 100 nm, and is sometimes on the order of microns. Thus, the additional variation in thickness of a patterned substrate introduced by the pattern features is negligible, and can be ignored as an approximation. Accordingly, the thickness of a patterned substrate assessed at a location that includes a protrusion may be approximated by subtracting a given feature thickness from the assessed thickness to yield an "adjusted" thickness, while thickness of a patterned substrate assessed at a location without a protrusion is unchanged. That is, the adjusted (reduced) thickness of a feature area and a native thickness of an unpatterned area will be used to calculate TTV for a substrate having a patterned surface. The low TTV values described herein are understood to result at least in part from flat optical grade glass templates, polished to meet a desired flatness, as well as methods described herein to minimize or reduce uneven material shrinkage during curing.

In 102, a polymerizable composition is disposed on a first surface of a first substrate. The first substrate may be heated (e.g., in a range of 100° C. to 250° C.) while the polymerizable composition is disposed on the first surface of the first substrate. Disposing the polymerizable composition on the first substrate may include casting a single volume of the polymerizable composition on the first substrate. The first substrate is typically a disc or wafer with a thickness in a range of 300 µm to 10 mm and a diameter in a range of 5 cm to 30 cm. The first substrate may be formed of material including silicon, quartz, glass, or other solid substance having a glass transition temperature that exceeds 250° C. The TTV of the first substrate is typically in a range of 100 nm to 20 µm. Optical performance of the resulting photonic device is typically enhanced by increasing the thickness and decreasing TTV of the first substrate. In one example, the first surface of the first substrate is a flat surface. In another example, the first surface of the first substrate is a patterned surface, and the first substrate is a patterned mold. As used herein, "patterned surface" and "patterned mold" generally refer to protrusions and recessions having a dimension (e.g., length, width, or height) less than 10 nm, less than 100 nm, less than 1 µm, less than 10 µm, less than 100 µm, or less than 1 mm. The patterned surface or patterned mold typically includes nanostructures (e.g., structures having all dimensions less than less than 1 µm or less than 100 nm), microstructures (e.g., structures having all dimensions in a range of 1 µm to less than 1 mm, less than 100 µm, or less than 1 µm), or any combination thereof.

Before the polymerizable composition is disposed on the first surface of the first substrate, the first substrate may be coated with a release layer. A thickness of the release layer is typically in a range of 1 nm to 30 nm thick. A release layer may be a fluorosilane coating, a metal coating, a metal oxide coating, or any other coating suitable for use with a curable high index polymerizable composition. In one example, a polydimethylsiloxane (PDMS) release layer is formed on the first substrate by a process that includes cleaning the first substrate, coating the first substrate with a thin layer of PDMS, and curing the PDMS by placing the first substrate on a hot plate and heating the substrate (e.g., at 200° C. for 15 min).

In some embodiments, high index polymerizable compositions include components in the amounts listed in Tables 1 and 2. Table 1 lists components in a polymerizable composition in which crosslinking occurs through a single type of functional group. Suitable functional groups include acrylate and epoxy functional groups. Exemplary compounds include 9,9-bis(4-hydroxyphenyl)fluorene diglycidyl ether, 4,4-bis(glycidyloxy-ethylthio)diphenylsulfide, and phenylthioethyl glycidyl ether. Table 2 lists components in a polymerizable composition in which crosslinking occurs through a cross-reaction of two or more different functional groups (e.g., a thiol and an ene).

TABLE 1

Polymerizable compositions in which crosslinking occurs through a single functional group

| | |
|---|---|
| High viscosity multifunctional component | 20~90% (w/w) |
| Low viscosity mono- or multifunctional component | 5~40% (w/w) |
| Photoinitiator | 0.2~5% (w/w) |
| Light stabilizer | 0.2~2% (w/w) |
| Antioxidant | 0.2~2% (w/w) |
| Surface active agent | 0~5% (w/w) |
| Inorganic nanoparticle or molecular level cluster | 0~40% (w/w) |

TABLE 2

Polymerizable compositions in which crosslinking occurs through cross-reaction of two or more different functional groups

| | |
|---|---|
| Multifunctional component with functionality type 1 | 20~80% (w/w) |
| Multifunctional component with functionality type 2 | 20~80% (w/w) |
| Photoinitiator | 0.2~5% (w/w) |
| Light Stabilizer | 0.2~2% (w/w) |
| Antioxidant | 0.2~2% (w/w) |
| Surface active agent | 0~5% (w/w) |
| Inorganic nanoparticle or molecular level cluster | 0~40% (w/w) |

In certain embodiments, polymerizable compositions in which crosslinking occurs through cross-reaction of two or more different functional groups include a mixture of ene monomers (each ene monomer having any combination of at least two of vinyl, allyl, and acrylate moieties) and thiol monomers (each thiol monomer having at least two thiol moieties). The ene monomers and thiol monomers may be combined in a stoichiometric ratio, with the number of available ene moieties equal to the number of thiol moieties, or any molar ratio (e.g., less than or greater than the stoichiometric ratio) effective to yield a polymer composite in the form of a free-standing polymeric structure. A few examples of suitable ene monomers are shown below.

where M is Si, Ge, or Sn

-continued 1,3,5-triallyl-1,3,5-triazine-2,4,6-trione 2,4,6-trivinyl-1,3,5-trithiane A few examples of thiol monomers include 1,2-ethanedithiol, 1,5-pentanedithiol, and 1,3-benzenedithiol, shown below.

1,2-ethanedithiol    1,5-pentanedithiol 1,3-benzenedithiol

The polymerizable composition may be doped with one or more inorganic components, such as $TiO_2$, $ZrO_2$, ZnO, and the like, in a concentration of 0.1 wt % to 50 wt % (e.g., 0.1 wt % to 10 wt % or 10 wt % to 30 wt %, or 10 wt % to 50 wt %).

In some cases, the polymerizable composition includes one or more polymerization initiators (e.g., a photoinitiator, a thermal initiator, or both). The concentration of the polymerization initiator is typically in a range of 0.1 wt % to 10 wt % (e.g., 0.1 wt % to 2 wt % or 2 wt % to 10 wt %). Examples of suitable photoinitiators include 2-benzyl-2-(dimethylamino)-4'-morpholinobutyrophenone; 4'-tert-butyl-2',6'-dimethyl-acetophenone; 2,2-diethoxyacetophenone; 2,2-dimethoxy-2-phenylacetophenone; diphenyl(2,4,6-trimethylbenzoyl)phosphine oxide/2-hydroxy-2-methylpropiophenone; 4'-ethoxyacetophenone; 3'-hydroxyacetophenone; 4'-hydroxyacetophenone; 1-hydroxy-cyclohexyl phenyl ketone; 2-hydroxy-4'-(2-hydroxyethoxy)-2-methylpropiophenone; 2-hydroxy-2-methylpropiophenone; 2-methyl-4'-(methylthio)-2-morpholinopropiophenone; 1-[4-(2-hydroxyethoxy)-phenyl]-2-hydroxy-2-methyl-1-propane-1-one, and 4'-phenoxy-acetophenone. Examples of suitable thermal initiators include tert-amyl peroxybenzoate, 4,4-azobis(4-cyanovaleric acid), 1,1-azobis(cyclohexanecarbonitrile), 2,2-azobisiso-butyronitrile (AIBN), benzoyl peroxide, 2,2-bis(tert-butylperoxy)butane, 1,1-bis(tert-butylperoxy)cyclohexane, 5-bis(tert-butylperoxy) 2,5-dimethyl-3-hexyne, 1,1-bis(tert-butylperoxy)-3,3,5-trimethylcyclohexane, and 2,4-pentanedione peroxide. Other compounds that generate reactive species through free radical formation may also be used as polymerization initiators.

The polymerizable composition may include a stabilizer or inhibitor to increase the shelf life of the composition. Suitable stabilizers include acidic components, radical stabilizers, and monomers such as 4-allyloxy-2-hydroxybenzophenone; 2-tert-butyl-4-ethylphenol; 2-(2H-benzotriazol-2-yl)-4,6-di-tert-pentylphenol; 2-(2H-benzotriazol-2-yl)-6-dodecyl-4-methylphenol; 2-[3-(2H-benzotriazol-2-yl)-4-hydroxyphenyl]ethyl methacrylate; 2-(2H-benzotriazol-2-yl)-4-methyl-6-(2-propenyl)phenol; 2-(4-benzoyl-3-hydroxyphenoxy)ethyl acrylate; 5-chloro-2-hydroxybenzophenone; 2,6-di-tert-butyl-4-(dimethylaminomethyl)phenol; 2,4-dihydroxybenzophenone; 2,2'-ethylidene-bis(4,6-di-tert-butylphenol); and similar compounds.

The polymerizable composition may include an antioxidant to inhibit or prevent certain chemical reactions that result in degradation of the polymer due to certain weather conditions. Suitable antioxidants include benzofuranone, hindered phenols, and secondary aromatic amines.

The polymerizable composition may include a surface active agent. The surface active agent may have at least one functional group such as a thiol or ene as well as at least one non-polar functional group such as alkyl, aryl, or fluoride. Suitable examples of surface active agents include alkylthiols such as octanethiol or decanethiol.

A process for fabricating high refractive index materials include combining first (ene) monomers, second (thiol) monomers, and optionally one or more inorganic components and other additives (e.g., polymerization initiators, stabilizers) to yield a composite mixture, and curing the composite mixture to yield a polymer composite. In some cases, polymerizable compositions described herein are formed by "click" reactions that result in covalent crosslinking of ene moieties (e.g., vinyl, allyl, or acrylate moieties) present on oxo-metal clusters with thiol moieties (e.g., thiol moieties). Oxo-metal clusters include metal oxo (meth) acrylate clusters ("MOCs"), where "metal" refers to titanium, zirconium, zinc, and the like. "Metal oxo" and "oxo metal" are used interchangeably herein, and "metal oxo (meth)acrylate clusters" include metal oxo acrylate clusters, metal oxo methacrylate clusters, and any combination thereof. Curing a polymerizable composition with MOCs includes crosslinking MOCs and thiol monomers. Suitable MOCs, such as $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, and the like, function as ene monomers.

Figure 2A:
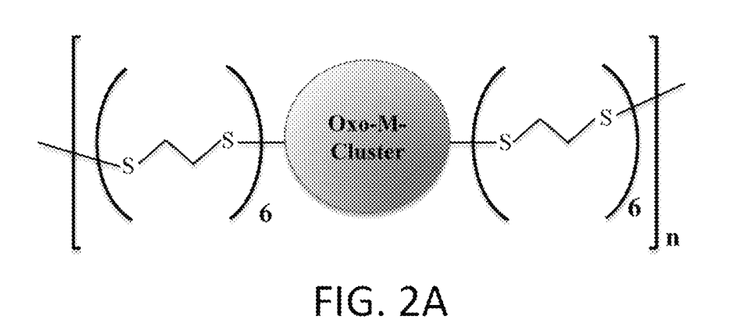
FIGS. 2A-2C depict oxo metal clusters.
Figure 2B:
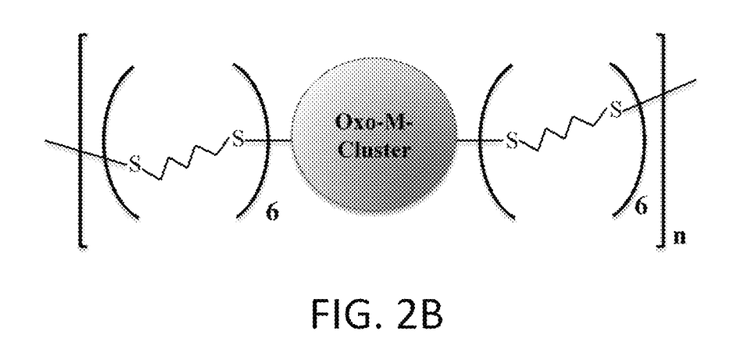
Figure 2C:
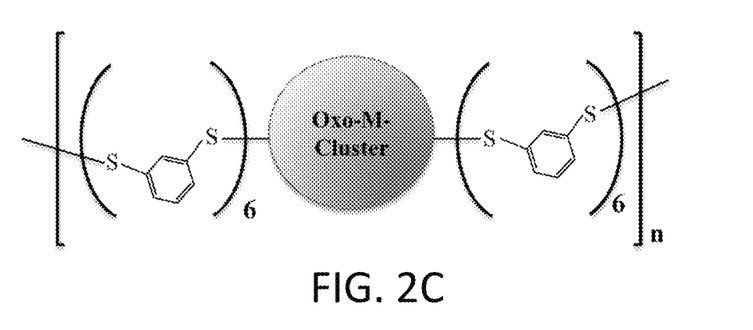

Polymer composites formed with MOCs may include one or more of the repeating units shown in FIGS. 2A-2C, in which "Oxo-M-Cluster" may be one or more of $Zr_6(OH)_4O_4(O_2C(CH_3)=CH_2)_{12}$, $Zr_4O_2(O_2C(CH_3)=CH_2)_{12}$, $Zr_6(OH)_4O_4(O_2CH=CH_2)_{12}$, $Zr_4O_2(O_2CH=CH_2)_{12}$, the corresponding units with other metals, or the like, and n is an integer. The MOCs provide ene functionalities to form polymers through crosslinking with thiol monomers. Unlike polymer composites in which inorganic components are included as dopants, these polymer composites are formed with a majority of the ene reactant in the form of MOCs.

MOCs may provide 1-100 wt % of the ene monomer in the composite mixture (e.g., 5-100 wt %, 10-100 wt %, 15-100 wt %, 20-100 wt %, 25-100 wt %, 50-100 wt %, 75-100 wt %, or 90-100 wt %). In certain cases, MOCs provide a majority of ene monomer in the composite mixture. The ene monomer may consist essentially of MOCs.

That is, the MOCs may provide all or substantially all the ene functionality in the composite mixture.

The polymerizable composition may be partially polymerized before it is disposed on the first substrate. Partial polymerization (e.g., in range of 30% to 50%) may be achieved, for example, by heating, irradiation with UV light, or both, to an extent such that the partially polymerized polymerizable composition is in liquid form and thus can be poured onto the first substrate. In one example, the polymerizable composition is heated in a range of 100° C. to 125° C. for 5-15 minutes after mixing and before the polymerizable composition is disposed on the first surface of the first substrate.

Referring again to FIG. 1, in 104, the polymerizable composition is contacted with a first surface of a second substrate. The second substrate may be at ambient temperature or may be heated before or while the polymerizable composition is contacted with the first surface of the second substrate. In one example, the second substrate is heated to a temperature that exceeds the temperature of the first substrate by 25° C. to 50° C. at the time the polymerizable composition is disposed on the first surface of the first substrate. The second substrate is typically a disc or wafer with a thickness in a range from 300 µm to 10 mm and a diameter in a range of 5 cm to 30 cm. The second substrate may be made of a material such as quartz, glass, or silica. The TTV of the second substrate is typically in a range from 100 nm to 20 µm. Optical performance of the resulting photonic device is typically enhanced by increasing thickness and decreasing TTV of the second substrate. In one example, the first surface of the second substrate is a flat surface. In another example, the first surface of the second substrate is a patterned surface, and the second substrate is a patterned mold, as described herein with respect to the first substrate. Typically, at least one of the first substrate and the second substrate is a patterned mold.

Before the polymerizable composition is contacted with the first surface of the second substrate, the second substrate may be coated with a release layer. A thickness of the release layer is typically in a range of 1 nm to 30 nm thick. A release layer may be a fluorosilane coating, a metal coating, a metal oxide coating, or any other coating suitable for use with a thiol-ene based polymer resin. In one example, a PDMS release layer is formed on the second substrate by a process that includes cleaning the second substrate, coating the second substrate with a thin layer of PDMS, and curing the PDMS by placing the second substrate on a hot plate and heating the substrate (e.g., at 200° C. for 15 min).

The polymerizable composition may be contacted with the first surface of the second substrate in such a way as to minimize defect formation due to trapping of gas between the first substrate and the second substrate. In one example, contacting the polymerizable composition with the substrate includes forming an acute angle between the first substrate and the second substrate, and reducing the value of the acute angle until the first substrate and the second substrate are parallel and separated by a predefined distance selected to yield a photonic device with a thickness in a range of 10 µm to 1 cm. Separation by the predefined distance may be achieved by a spacer positioned between the first surface of the first substrate and the first surface of the second substrate. In one example, two or more spacers are coupled to the first surface of the first substrate, the first surface of the second substrate, or both.

In 106, the polymerizable composition is cured to yield a polymeric structure having a first surface in contact with the first surface of the first substrate, a second surface opposite the first surface of the polymeric structure and in contact with the first surface of the second substrate. Curing of the polymerizable composition, for example by heating only, by irradiating with UV radiation only, or by a combination of heating and irradiating with UV radiation, may be selected to tune the mechanical and optical properties of the resulting photonic device. In some cases, partial curing by UV irradiation is followed by heating (e.g., at a temperature in a range of 100° C. to 350° for 5 minutes to 24 hours) to completely cure the polymerizable composition, thereby yielding a polymeric structure between the first surface of the first substrate and the first surface of the second substrate.

In some embodiments, curing the polymerizable composition is achieved by irradiating the polymerizable composition with controllable, high intensity, uniform UV irradiation. As used herein, uniform UV irradiation generally refers to UV irradiation having an intensity that is substantially constant throughout the duration of the irradiating of the polymerizable composition. As used herein, "substantially constant" UV irradiation intensity typically refers to a variation of UV intensity throughout the duration of the irradiating of less than 20% of peak intensity. The use of UV radiation including UVA, UVB, UVC, or a combination thereof, from a uniform, large area, and collimated source, and having a power density of at least 10 mW/cm$^2$ promotes polymerization and curing of a high index polymer substrate efficiently without leaving regions where the polymer chains are cured differently than others. The power density is typically less than 20,000 mW/cm$^2$. Differences in curing can include a different arrangement of polymer chains, non-uniformity in arrangement of polymer chains, and the like. When the UV intensity is not uniform and well-collimated, or scattering occurs, such as back scattering or scattering from surfaces proximate the polymerizable composition to be cured, the polymer can undergo distortions at the bulk level, increasing TTV, reducing the overall transparency of the resulting polymer, or both. A high intensity, uniform UV source may also uniformly heat the polymer to a temperature less than 100° C., which can also aid in further curing of the polymer and improve its chemical stability.

This UV in-situ polymerization and curing process yields low TTV and low bow/warp for polymeric structures having a thickness from about 200 µm to about 500 µm. These polymeric structures can be fabricated as a standalone (free-standing) substrates or with a waveguide relief pattern formed on at least one surface. Moreover, in some instances, polymerization in the absence of thermal curing can be achieved in less than 5 minutes and is thus suitable for rapid, cost-effective, large-scale production.

In 108, the polymeric structure is separated from the first substrate and the second substrate to yield a monolithic photonic device. The polymeric structure is typically allowed to cool to room temperature before it is separated from the first substrate and the second substrate. Separating the polymeric structure from the first substrate and the second substrate may include de-molding or peeling the polymeric structure off the first or second substrate. The monolithic photonic device is optically transparent and has a refractive index in the range of 1.6 to 1.9 or 1.7 to 1.9. In one example, the field of view (4:3 aspect ratio) of the photonic device is up to 50°. The photonic device has a residual layer thickness in the range of 10 µm to 1 cm. As used herein, "residual layer thickness" refers to the minimum distance between the first surface of the photonic device and the second surface of the photonic device.

In some cases, one or more of the operations in process 100 is replaced or combined with another operation, the order of one or more the operations is interchanged, two or more operations occur simultaneously or continuously, or any combination thereof. In certain cases, process 100 may include one or more additional operations as described herein.

Figure 3:
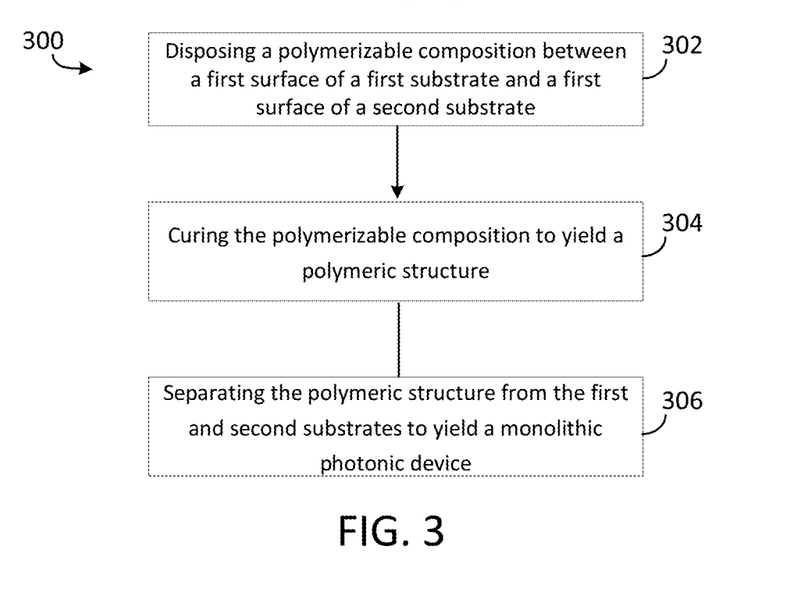
FIG. 3 is a flowchart of a second exemplary process for fabrication of a photonic device.

FIG. 3 is a flowchart describing a second exemplary process 300 for fabrication of a monolithic, optically transparent, high refractive index photonic device from a curable high index polymerizable composition. Details regarding the substrates, the polymerizable composition, and the fabrication process described with respect to process 100 also apply to process 300 unless described otherwise.

In 302, a polymerizable composition is disposed between a first surface of a first substrate and a first surface of a second substrate. The first surface of the first substrate and the first surface of the second are separated (e.g., by spacers) to achieve a desired thickness of the photonic device. Disposing the polymerizable composition between the first substrate and the second substrate may include injecting the polymerizable composition between the two substrates. The first substrate, the second substrate, or both may be heated (e.g., to a temperature in a range of 100° C. to 250° C.) while the polymerizable composition is disposed between the first substrate and the second substrate.

In 304, the polymerizable composition is cured to yield a polymeric structure having a first surface in contact with the first surface of the first substrate, a second surface opposite the first surface of the polymeric structure and in contact with the first surface of the second substrate. Curing may be achieved by heating only, UV irradiation only, or a combination of heating and UV irradiation, such as described with respect to FIG. 1. In 306, the polymeric structure is separated from the first substrate and the second substrate to yield a monolithic photonic device.

In some cases, one or more of the operations in process 300 is replaced or combined with another operation, the order of one or more the operations is interchanged, two or more operations occur simultaneously or continuously, or any combination thereof. In certain cases, process 300 may include one or more additional operations as described herein.

Figure 4:
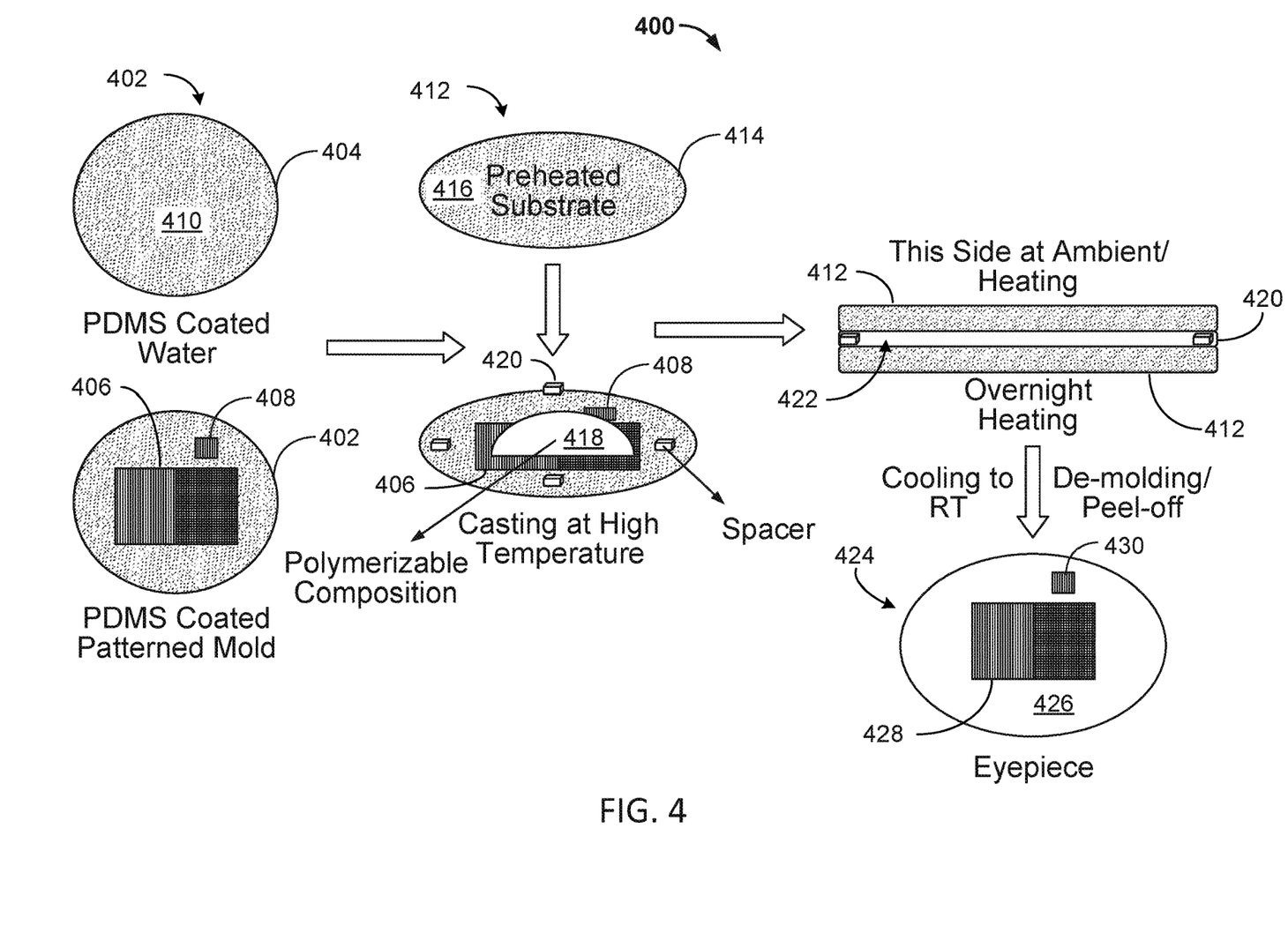
FIG. 4 depicts fabrication of an exemplary photonic device.

FIG. 4 depicts process 400 for fabricating an exemplary photonic device. Details of process 400 may be understood with respect to process 100 unless described otherwise. First substrate 402 is a patterned mold having a first surface 404 with pattern 406 of protrusions and recessions, as well as in-coupling grating 408. First substrate 402 is coated with release layer 410. Second substrate 412 has first surface 414 coated with release layer 416. First substrate 402 and second substrate 412 are both heated before polymerizable composition 418 is disposed on first surface 404 of the first substrate. Polymerizable composition 418 is a curable high index polymerizable composition as described herein. Second substrate 412 is advanced toward the first substrate 402 until the second substrate contacts spacers 420, thereby spreading polymerizable composition 418 between the first substrate and the second substrate, filling pattern 406. Polymerizable composition 418 is cured via UV irradiation only, heating only, or a combination of UV irradiation and heating, such as described with respect to FIG. 1, to yield polymeric structure 422. Polymeric structure 422 is cooled to room temperature and then separated from first substrate 402 and second substrate 412 to yield monolithic photonic device 424. First surface 426 of monolithic photonic device 424 has pattern 428 of protrusions and recessions, as well as in-coupling grating 430. Monolithic photonic device 424 is optically transparent and has a refractive index in the range of 1.6 to 1.9. The field of view (4:3) of monolithic photonic device 426 is up to 50°.

Figure 5A:
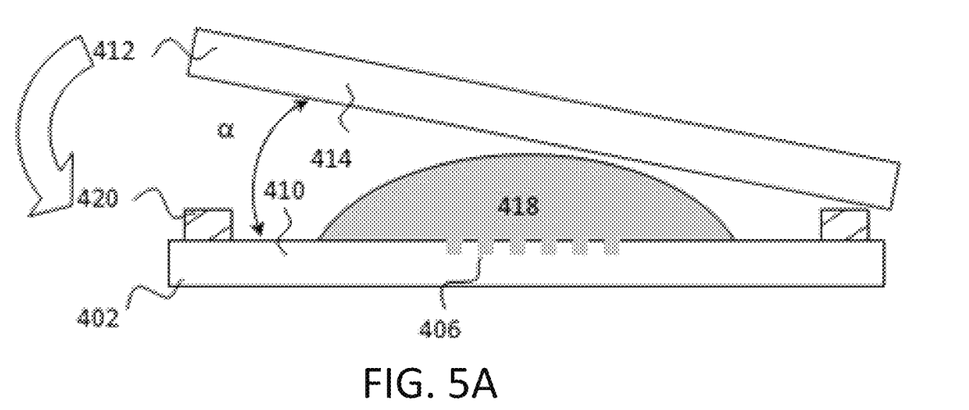
FIGS. 5A-5C, 6A-6C, and 7A-7C depict contacting a polymerizable composition with a substrate to reduce defect formation in a photonic device.
Figure 5B:
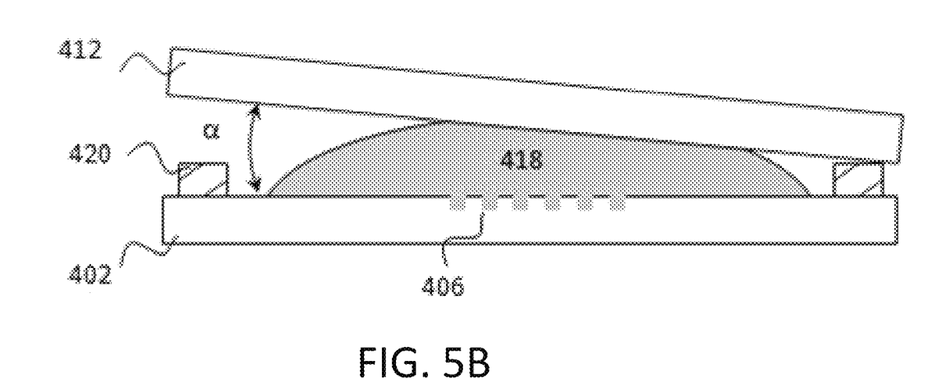
Figure 5C:
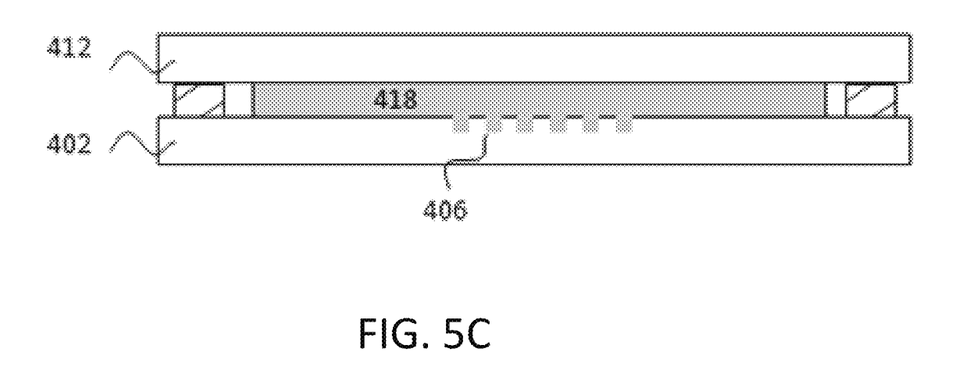

In process 400, polymerizable composition 418 may be contacted with the first surface 414 of the second substrate 412 in such a way as to minimize defect formation in the resulting photonic device due to trapping of gas between the first substrate 402 and the second substrate. In one example, as depicted in FIG. 5A, contacting the polymerizable composition 418 with the second substrate 412 includes forming an acute angle α between the first substrate 402 and the second substrate. Second substrate 412 is rotated toward first substrate 402 as indicated by the arrow, reducing the value of the acute angle α as depicted in FIG. 5B. As depicted in FIG. 5C, rotation of second substrate 412 continues until the first substrate 402 and the second substrate 412 are parallel and separated by spacers 420, which define a distance selected to yield a photonic device with a maximum thickness in a range of 10 μm to 1 cm.

Figure 6A:
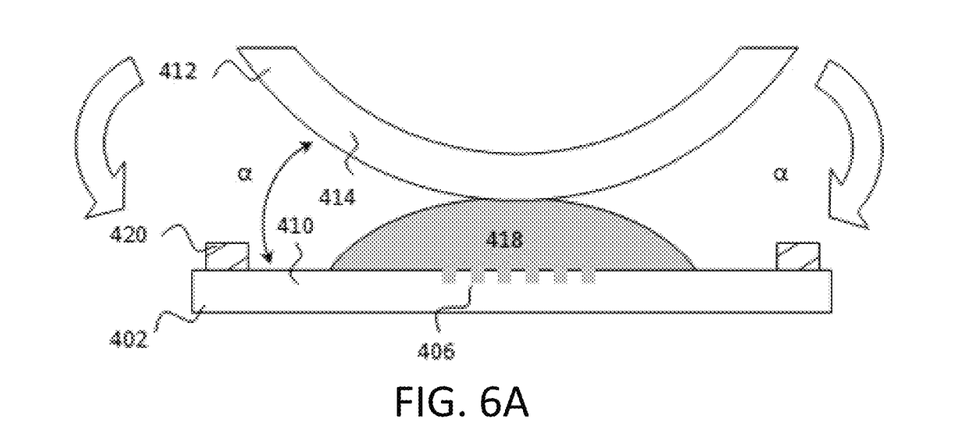
Figure 6B:
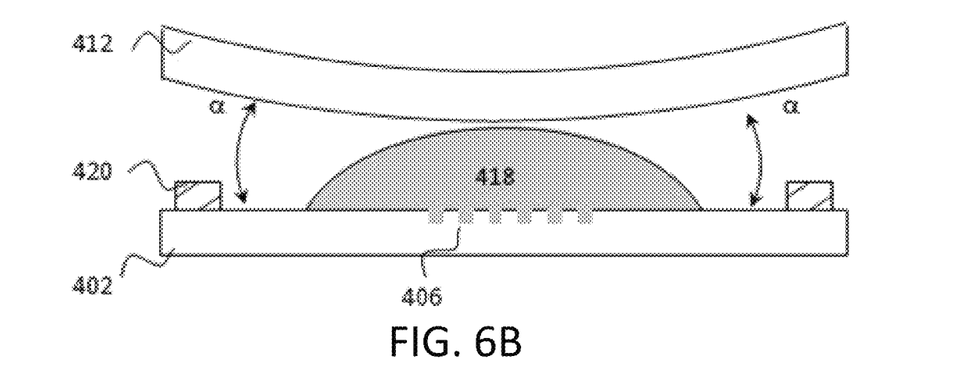
Figure 6C:
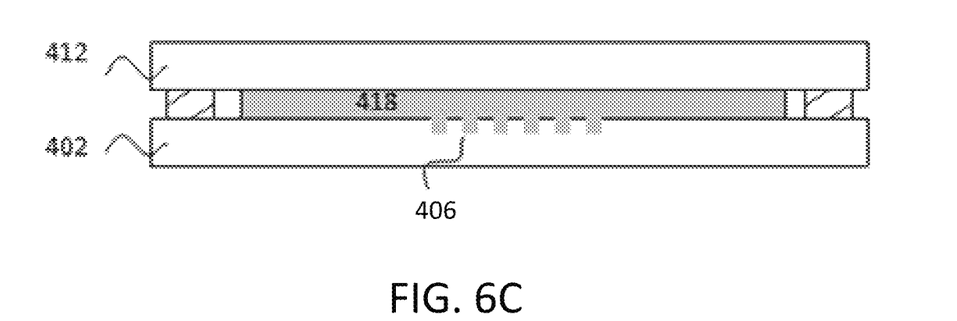

In another example, as depicted in FIG. 6A, second substrate 412 is flexed before contacting polymerizable composition 418, and the convex first surface of the second substrate is contacted with the polymerizable composition. After contacting polymerizable composition 418, the ends of second substrate 412 are advanced toward first substrate 402 as depicted in FIG. 6B, reducing the value of angle α. As depicted in FIG. 6C, first substrate 402 and second substrate 412 are parallel and separated by spacers 420.

Figure 7A:
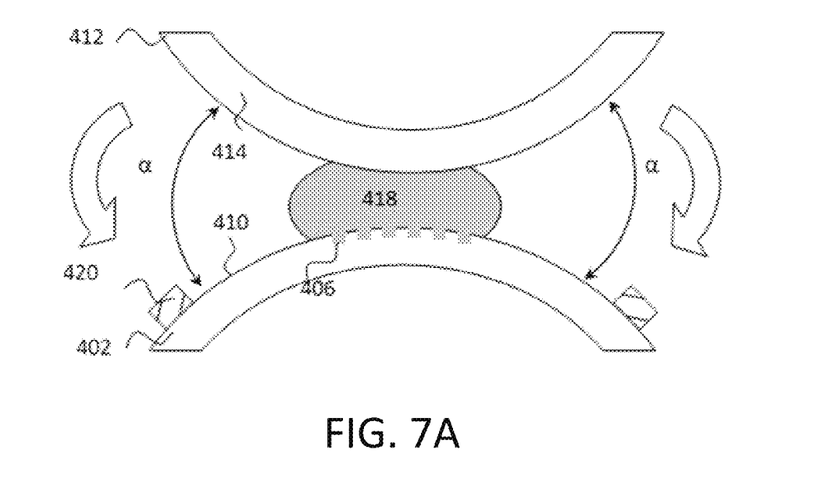
Figure 7B:
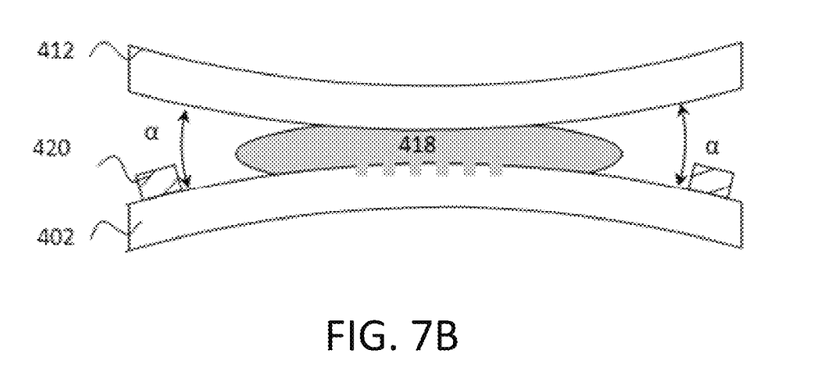
Figure 7C:
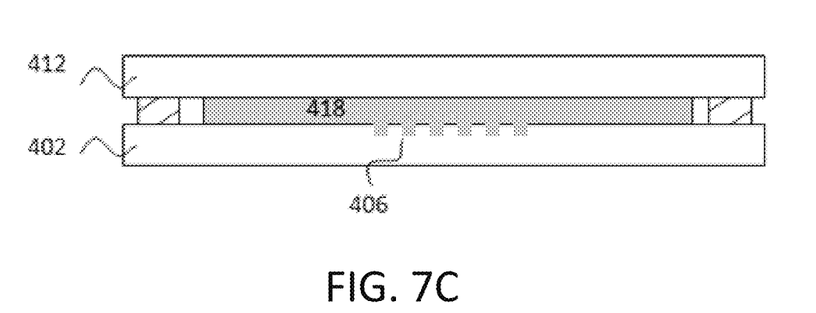

In yet another example, as depicted in FIG. 7A, first substrate 402 and second substrate 412 are flexed when the second substrate contacts polymerizable composition 418, and the polymerizable composition on the convex first surface of the first substrate is contacted with the convex first surface of the second substrate. After contacting polymerizable composition 418, the ends of second substrate 412 are advanced toward first substrate 402 as depicted in FIG. 7B, reducing the value of angle α. As depicted in FIG. 7C, first substrate 402 and second substrate 412 are parallel and separated by spacers 420.

Removing gas trapped between the first and second substrates may also be achieved by disposing the polymerizable composition on the first substrate in a helium environment or by reducing, below atmospheric pressure, a pressure of the environment in which the imprinting process is performed before polymerization of the polymerizable composition is initiated. Replacing trapped air with helium typically reduces defects in the resulting polymeric structure, since helium escapes more readily from solution than air. Reducing the pressure of the environment may force trapped gas toward edges of the first and second substrates. After trapped gas is removed from the polymerizable composition, gas containing oxygen (e.g., air) may be introduced as needed for curing of the polymerizable composition.

Figure 8A:
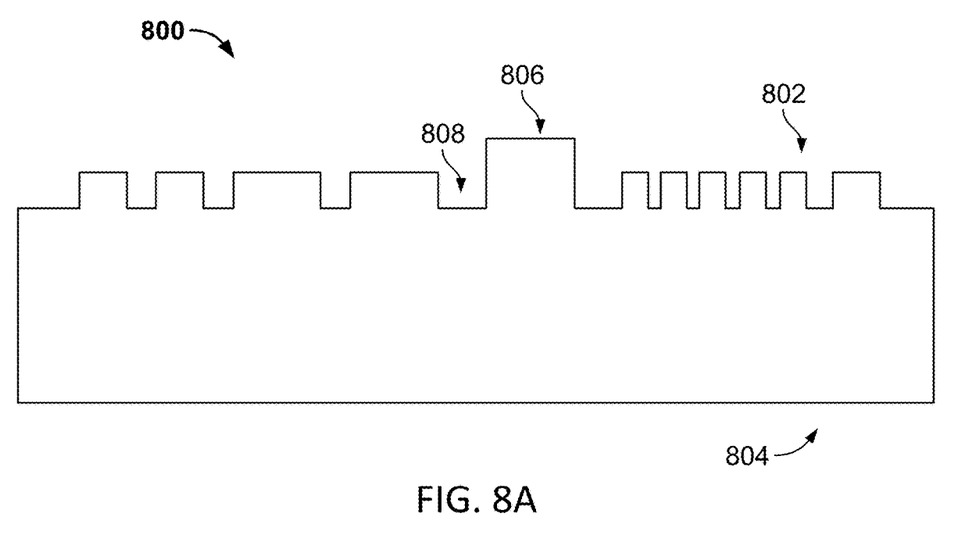
FIGS. 8A and 8B depict exemplary monolithic photonic devices.

FIG. 8A depicts exemplary monolithic, optically transparent photonic device 800 having patterned first surface 802 and flat second surface 804. Patterned first surface 802 has protrusions 806 and recessions 808. Protrusions 806 and recessions 808 may be uniform or vary in dimensions. Protrusions 806 are nanostructures, microstructures, or a combination thereof, as described herein. Photonic device 800 has a residual layer thickness r in the range of 10 μm to 1 cm. As used herein, "residual layer thickness" refers to the minimum distance between the first surface of the photonic device and the second surface of the photonic device.

Figure 8B:
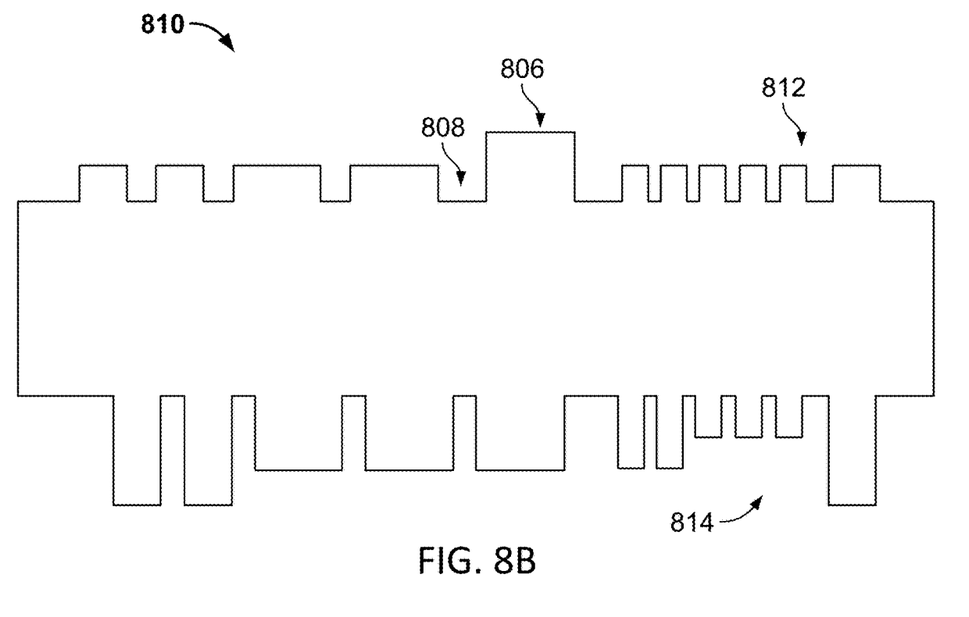

FIG. 8B depicts exemplary monolithic, optically transparent photonic device 810 having patterned first surface 812 and patterned second surface 814. Patterned first surface 812 and patterned second surface 814 have protrusions 806 and recessions 808. Protrusions 806 and recessions 808 may be uniform or vary in dimensions. Protrusions 806 are nanostructures, microstructures, or a combination thereof, as described herein. Photonic device 810 has a residual layer thickness r in the range of 10 µm to 1 cm.

For high volume or high quantity casting of polymeric structures, use of interchangeable UV transmissive casting plates or wafers designed to achieve appropriate spacing may include grooves or raised surfaces, thereby obviating the need for separate spacers. Such casting plates or wafers may be fabricated from fused silica or high quality quartz that have high UV transmission at wavelengths greater than 200 nm. Having a spacer thickness integrated (e.g., machined, wet/dry etched, etc.) into the casting plates helps ensure that a suitable gap distance is maintained between stacked polymeric structures with application of a suitable force pushing the two plates together, where the gap distance is maintained by the integrated spacer, and the gap is not susceptible to variations due to casting tool vibrations during the operation of production tools. Casting tool vibrations or other irregularities during casting can create undesirable TTV variations leading to poor image quality.

Figure 9A:
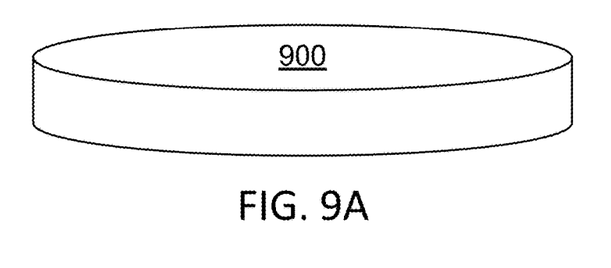
FIGS. 9A-9D depict exemplary casting plates.
Figure 9B:
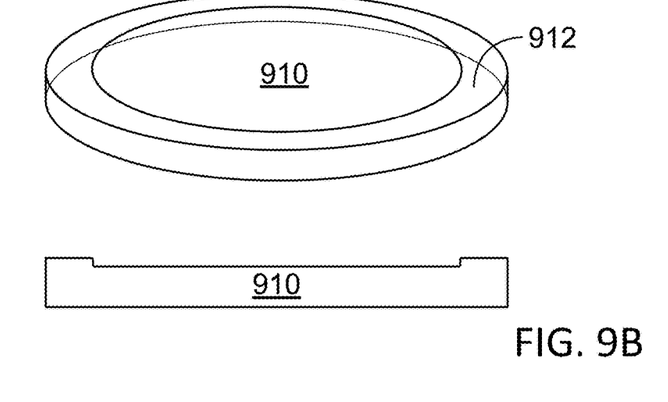
Figure 9C:
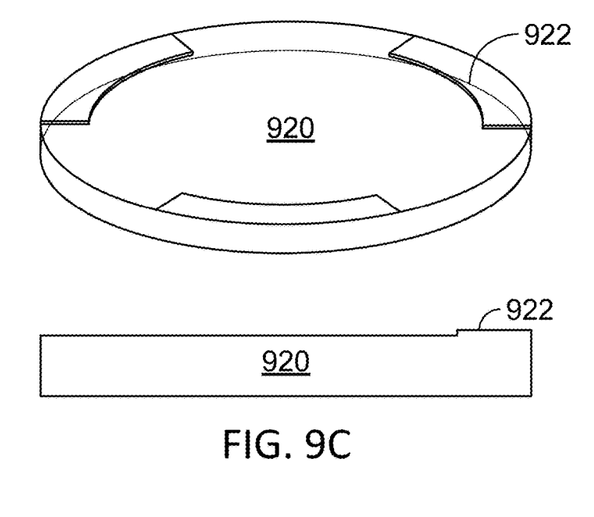
Figure 9D:
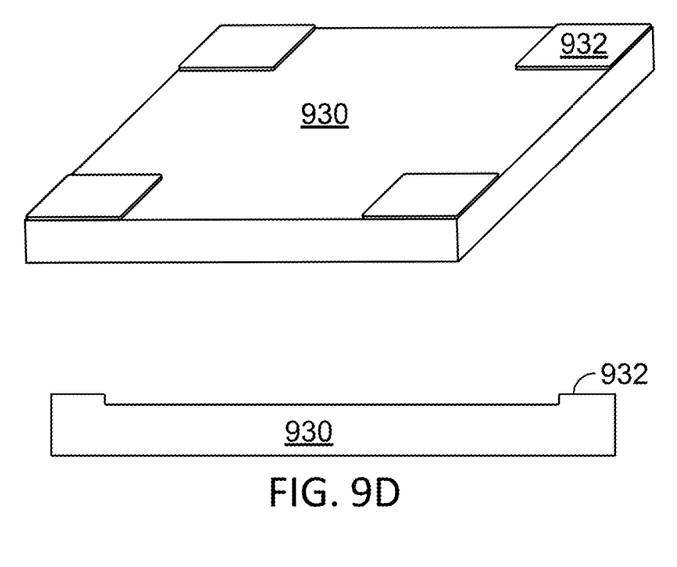

FIGS. 9A-9D depict exemplary casting plates suitable for interchangeable inserts in production tools with pre-machined grooves for casting blank or patterned polymeric structures or films of a selected thickness. Each feature depicted in FIGS. 9A-9D has a TTV of less than ±1 µm. FIG. 9A is a perspective view of cylindrical casing plate 900. In one example, cylindrical casting plate 900 has a radius of 75 mm and a thickness of 10 mm. FIG. 9B is a perspective and cross-sectional view of cylindrical casting plate 910 having ledge 912 around its perimeter. In one example, a radius of cylindrical casting plate 910 is 75 mm, and a length of ledge 912 along the radius of the cylindrical casting plate is 15 mm. A thickness of cylindrical casting plate 910 is 10 mm at the center of the casting plate, and a thickness of the ledge is 200 µm-500 µm (e.g., 350 µm). FIG. 9C is a perspective and cross-sectional view of cylindrical casting plate 920 having ledges 922 around portions of its perimeter. In one example, a radius of cylindrical casting plate 920 is 75 mm, and a length of ledge 922 along the radius of the cylindrical casting plate is 15 mm. A thickness of cylindrical casting plate 920 is 10 mm at the center of the casting plate, and a thickness of each ledge is 200 µm-500 µm (e.g., 350 µm). FIG. 9D is a perspective and cross-sectional view of rectangular casting plate 930 having spacers 932 in its corners. In some instances, rectangular casting plate 930 is square. In one example, rectangular casting plate 930 is a square having a side length of 150 mm and a thickness of 10 mm. In one example, spacers 932 are square having a side length of 15 mm and a thickness of 300 µm-500 µm (e.g., 350 µm).

EXAMPLES

Figure 10A:
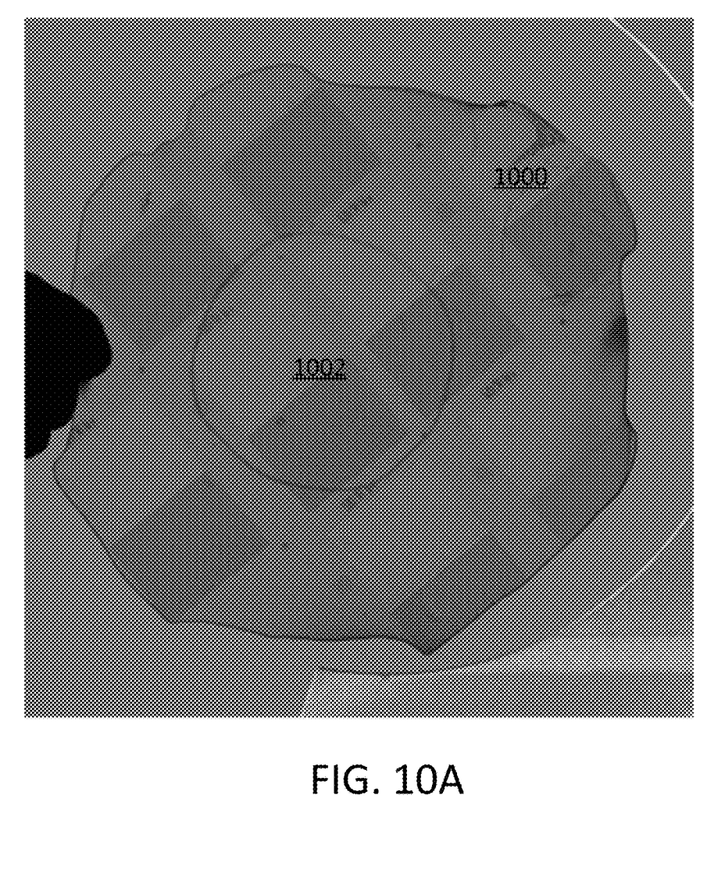
FIG. 10A is an image of a polymeric film irradiated with non-uniform UV intensity.
Figure 10B:
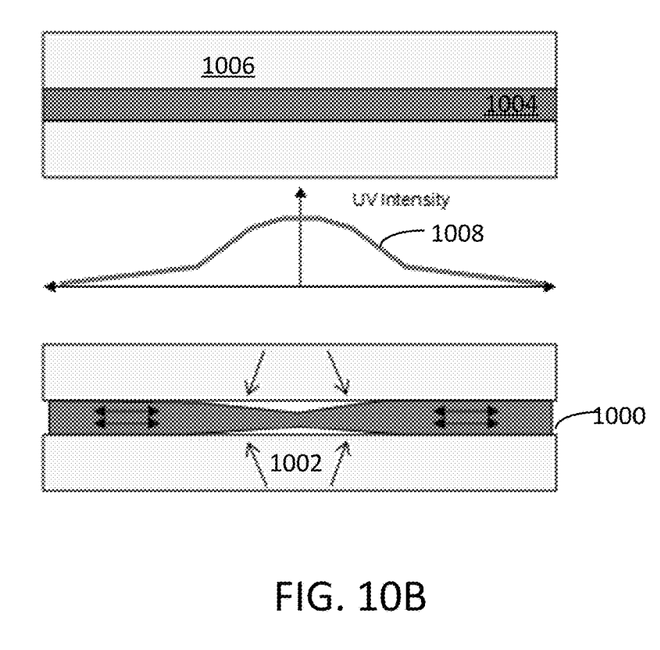
FIG. 10B depicts irradiation of a polymeric composition with a non-uniform UV intensity.

A polymerizable composition was prepared by mixing tetravinylsilane and 1,3-benzenedithiol in 1:2 molar ratio, respectively. To this monomer mixture, 1% (w/w) photoinitiator (2-hydroxy-2-methylpropiophenone) was added to generate free radicals during UV exposure. A thiol-ene "click" composition was used within 1 min post mixing. The composition was evenly dispensed at the center of the patterned quartz 550 µm plate and the around 2" in diameter. The top 1 mm plate was then brought in contact with 300 µm spacers kept between the two plates at the edges. The two plates and the uncured material in between were cured with a non-uniform UVA source. The UVA source had a 2" diameter high intensity zone (~110 mW/cm$^2$) which was extended to fully cure up to a 5" area using a 5" diffuser, which reduced intensity towards the edges to about ~30 mW/cm$^2$ or lower. FIG. 10A is an image of the resulting fully patterned UV cured film (diameter of 5") 1000, in which center portion 1002 self-delaminated after curing. The intensity of the UV source during curing of film 1000 is depicted in FIG. 10B, in which polymerizable composition 1004 is shown between casting plates 1006. UV intensity 1008 over the diameter of the casting plates 1004 results in self delamination of a center portion 1002 of polymeric film 1000.

Figure 11:
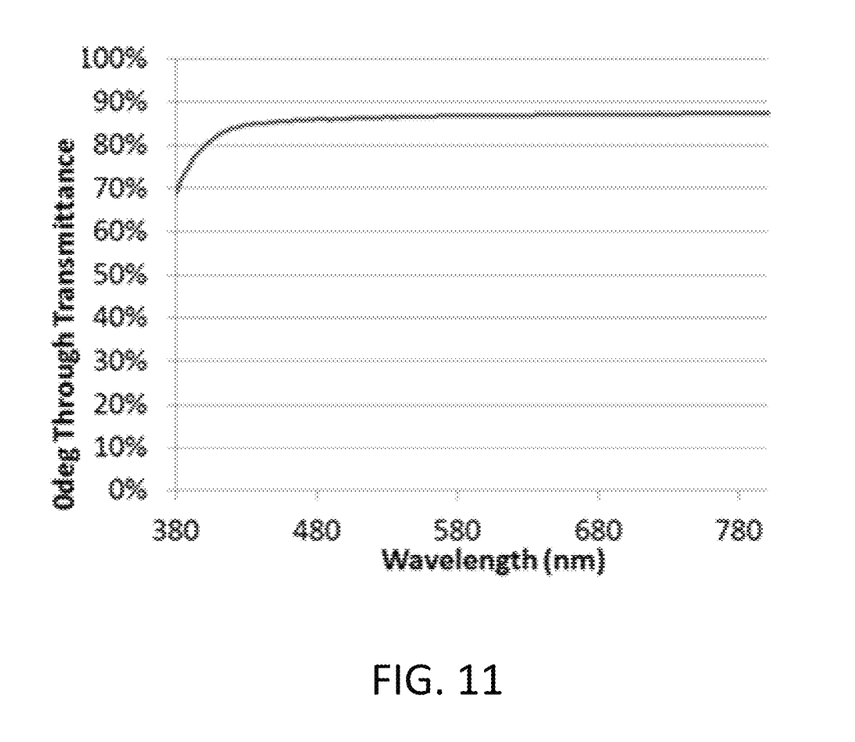
FIG. 11 is a graph showing transmittance of light through a polymeric substrate.

FIG. 11 is a graph showing an average transmittance of light at wavelengths from 380 nm to 800 nm through a polymeric substrate. Transmission was measured using a spectrometer and a white light source having a 0° angle of incidence of the light source with respect to the surface of the fabricated polymer substrate. The measured spot size was about 3 mm to about 5 mm in diameter. Multiple points were measured.

A number of embodiments have been described. Nevertheless, it will be understood that various modifications may be made without departing from the spirit and scope of the inventions.

What is claimed is:

1. A method of fabricating a high refractive index photonic device, the method comprising:
   partially polymerizing a polymerizable composition to a liquid form by heating in a range of 100° C. to 125° C. to provide a partially polymerized composition;
   disposing the partially polymerized composition on a first surface of a first substrate after heating the first substrate to a temperature between 100° C. and 250° C., wherein the first surface is a patterned surface including one or more nanostructures;
   contacting the partially polymerized composition with a first surface of a second substrate, thereby spreading the partially polymerized composition on the first surface of the first substrate, wherein contacting the partially polymerized composition with a first surface of a second substrate comprises:
   forming an acute angle between the first substrate and the second substrate, and
   reducing the value of the acute angle by rotating the second substrate toward the first substrate until the first substrate and the second substrate are parallel to each other and are separated by a predefined distance;
   curing the partially polymerized composition to yield a polymeric structure having a first surface in contact with the first surface of the first substrate, having a second surface opposite the first surface of the polymeric structure and in contact with the first surface of the second substrate, and having a selected residual layer thickness between the first surface of the polymeric structure and the second surface of the polymeric structure in a range of 10 µm to 1 cm.

2. The method of claim 1, further comprising separating the polymeric structure from the first substrate and the second substrate to yield a monolithic photonic device, wherein the refractive index of the monolithic photonic device is at least 1.5.

3. The method of claim 2, further comprising flexing the second substrate, wherein reducing the value of the acute angle comprises advancing ends of the second substrate toward the first substrate to reduce the acute angle between the first substrate and the second substrate.

4. The method of claim 2, further comprising flexing the first substrate and the second substrate, wherein reducing the value of the acute angle comprises advancing ends of the second substrate and ends of the first substrate toward one another to reduce the acute angle between the first substrate and the second substrate.

5. The method of claim 2, comprising:
reducing a pressure of an environment in which the method is performed to below atmospheric pressure.

6. The method of claim 5, comprising re-introducing oxygen into the environment in which the method is performed before curing the partially polymerized composition.

7. The method of claim 2, comprising introducing helium into an environment in which the method is performed.

8. The method of claim 7, comprising re-introducing oxygen into the environment in which the method is performed before curing the partially polymerized composition.

9. The method of claim 2, further comprising coating the first surface of the first substrate with a release layer before disposing the partially polymerized composition on the first surface of the first substrate.

10. The method of claim 9, wherein the release layer comprises a fluorosilane coating, a metal coating, or a metal oxide coating.

11. The method of claim 2, comprising heating the second substrate to a temperature that exceeds the temperature of the first substrate by at least 25° C. at the time the partially polymerized composition is disposed on the first surface of the first substrate.

12. The method of claim 2, wherein curing the partially polymerized composition comprises heating the polymerizable composition to a temperature less than 100° C.

13. The method of claim 2, wherein the selected residual layer thickness between the first surface of the polymeric structure and the second surface of the polymeric structure is in a range of 250 µm to 500 µm.

14. The method of claim 2, wherein a transmittance of the monolithic photonic device is greater than 80% between 400 nm and 800 nm.

15. The method of claim 2, further comprising coating the first surface of the second substrate with a release layer before contacting the partially polymerized composition with the first surface of the second substrate.

16. The method of claim 2, wherein the polymerizable composition comprises:
first monomers, each first monomer having at least two vinyl, allyl, or acrylate moieties; and
second monomers, each second monomer having at least two thiol moieties.

17. The method of claim 16, wherein the polymerizable composition comprises a photoinitiator, a thermal initiator, or both.

18. The method of claim 2, wherein the monolithic photonic device is a lens.

19. The method of claim 1, wherein the predefined distance between the first substrate and the second substrate is formed by a spacer that is positioned between the first surface of the first substrate and the first surface of the second substrate.

* * * * *